Sept. 12, 1944.   F. J. MacDONALD   2,358,176
METHOD AND APPARATUS FOR MAKING ARTICLES OF PLASTIC MATERIAL
Filed May 22, 1940   5 Sheets-Sheet 1
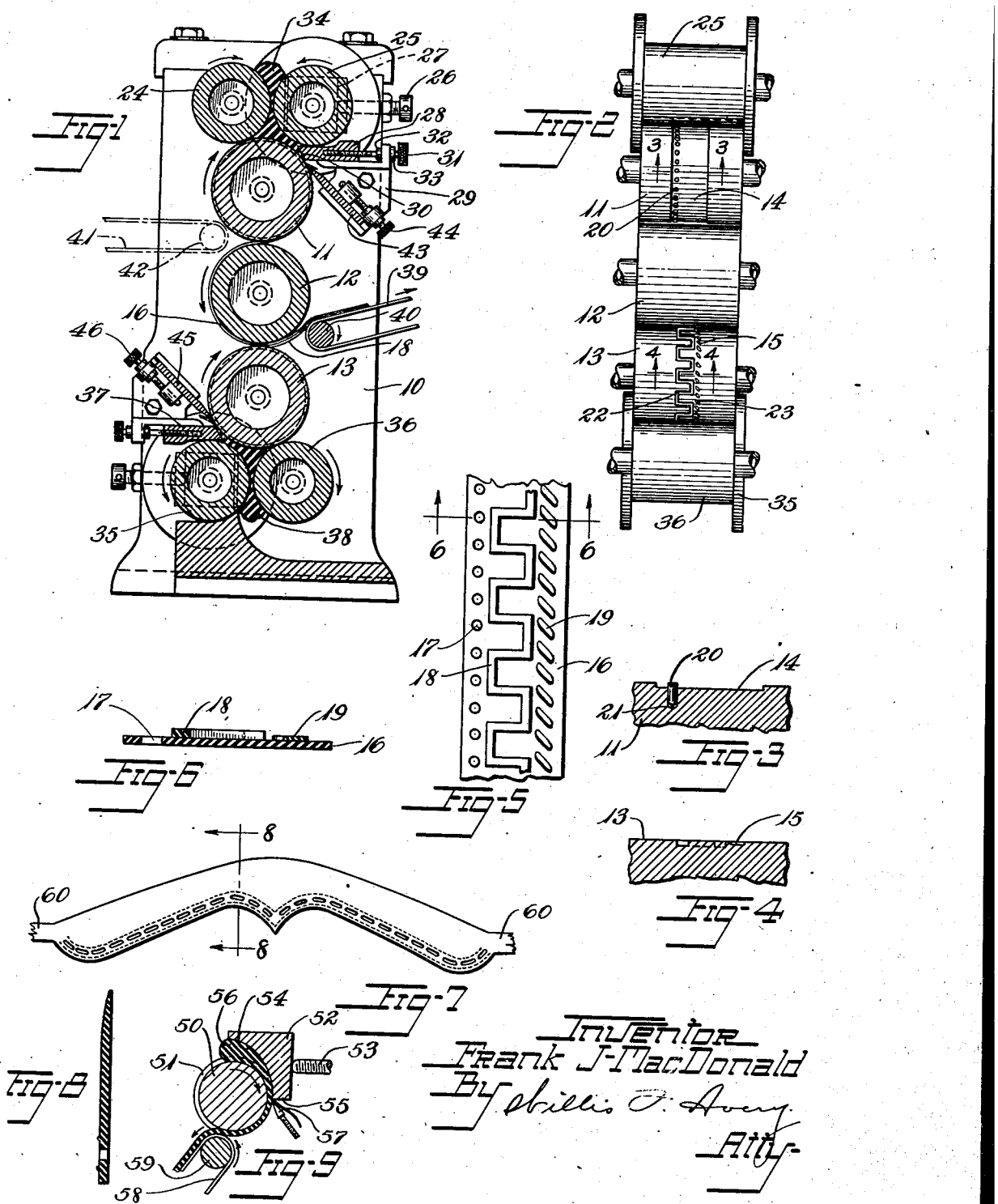

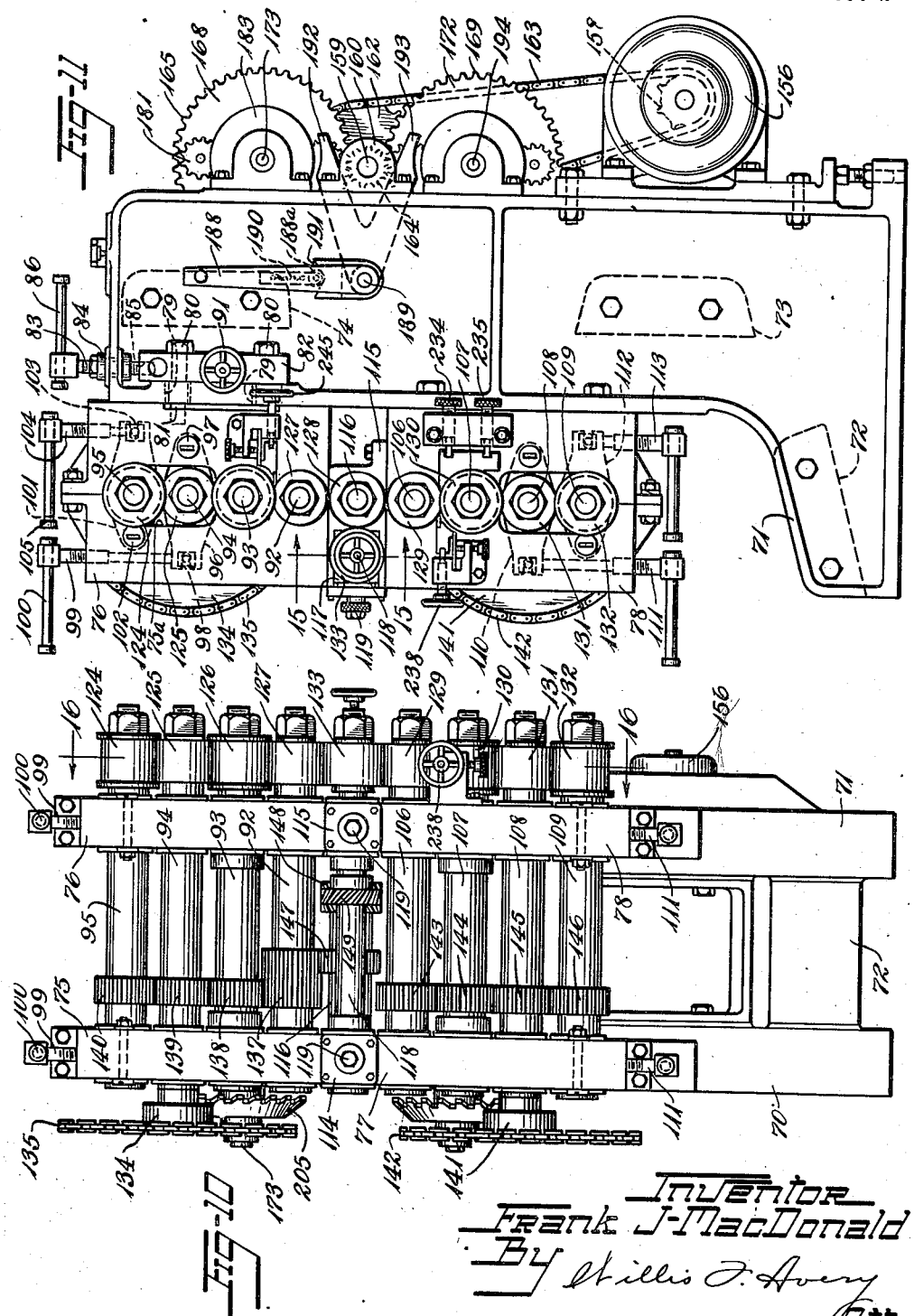

Sept. 12, 1944.   F. J. MacDONALD   2,358,176
METHOD AND APPARATUS FOR MAKING ARTICLES OF PLASTIC MATERIAL
Filed May 22, 1940   5 Sheets-Sheet 3
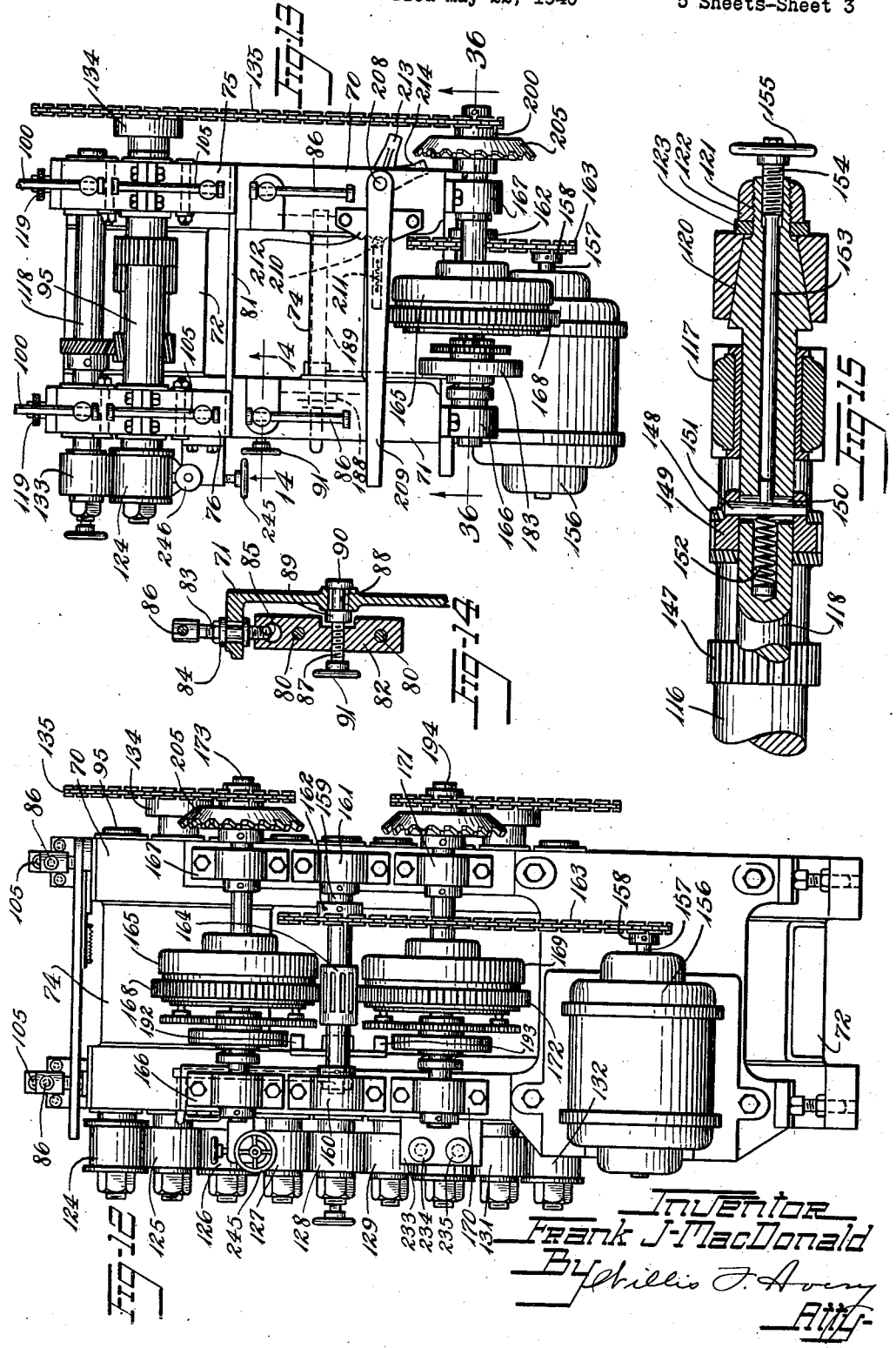
Inventor
Frank J. MacDonald
By Phillis F. Avery
Atty.

Sept. 12, 1944.   F. J. MacDONALD   2,358,176
METHOD AND APPARATUS FOR MAKING ARTICLES OF PLASTIC MATERIAL
Filed May 22, 1940   5 Sheets-Sheet 4
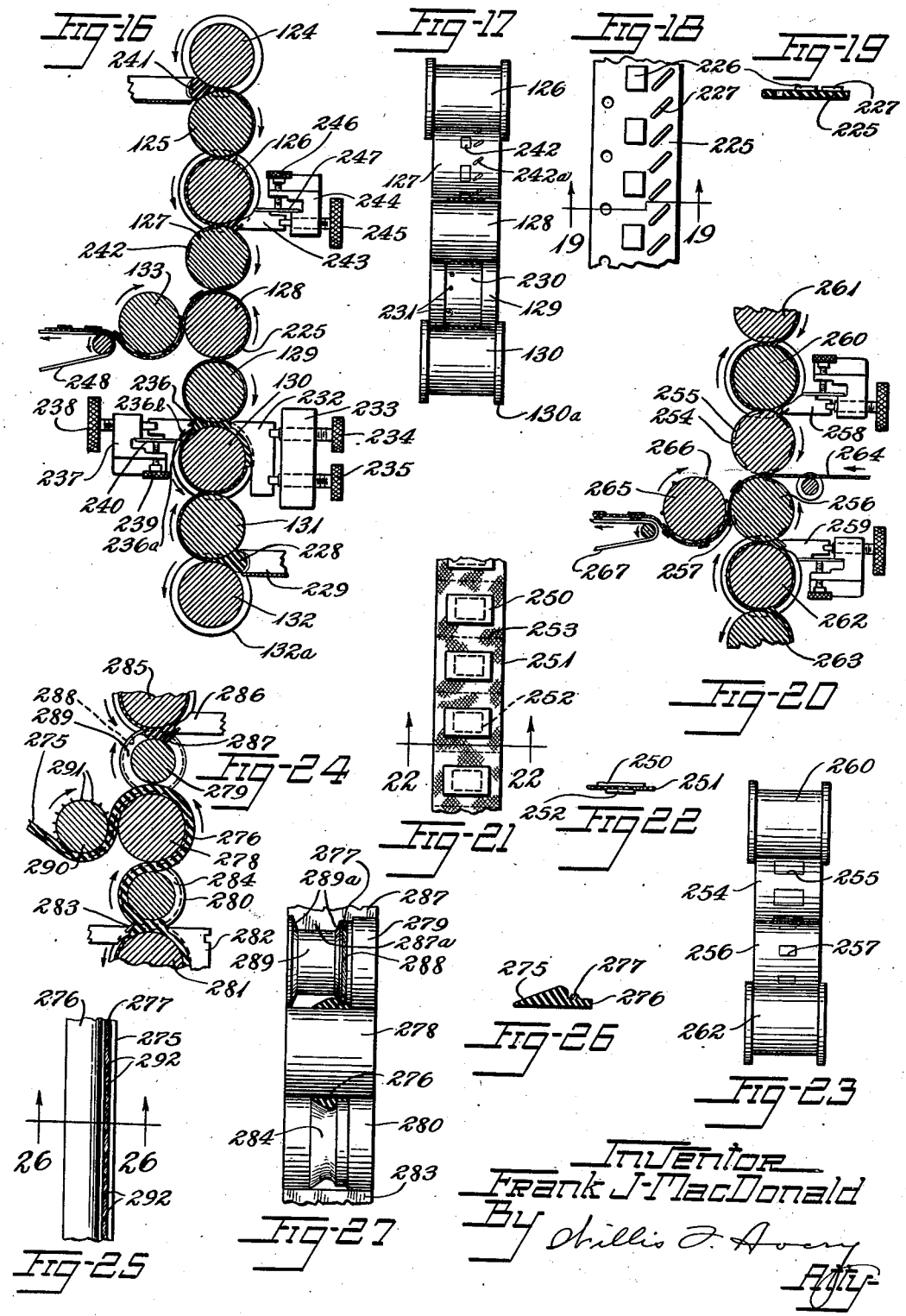

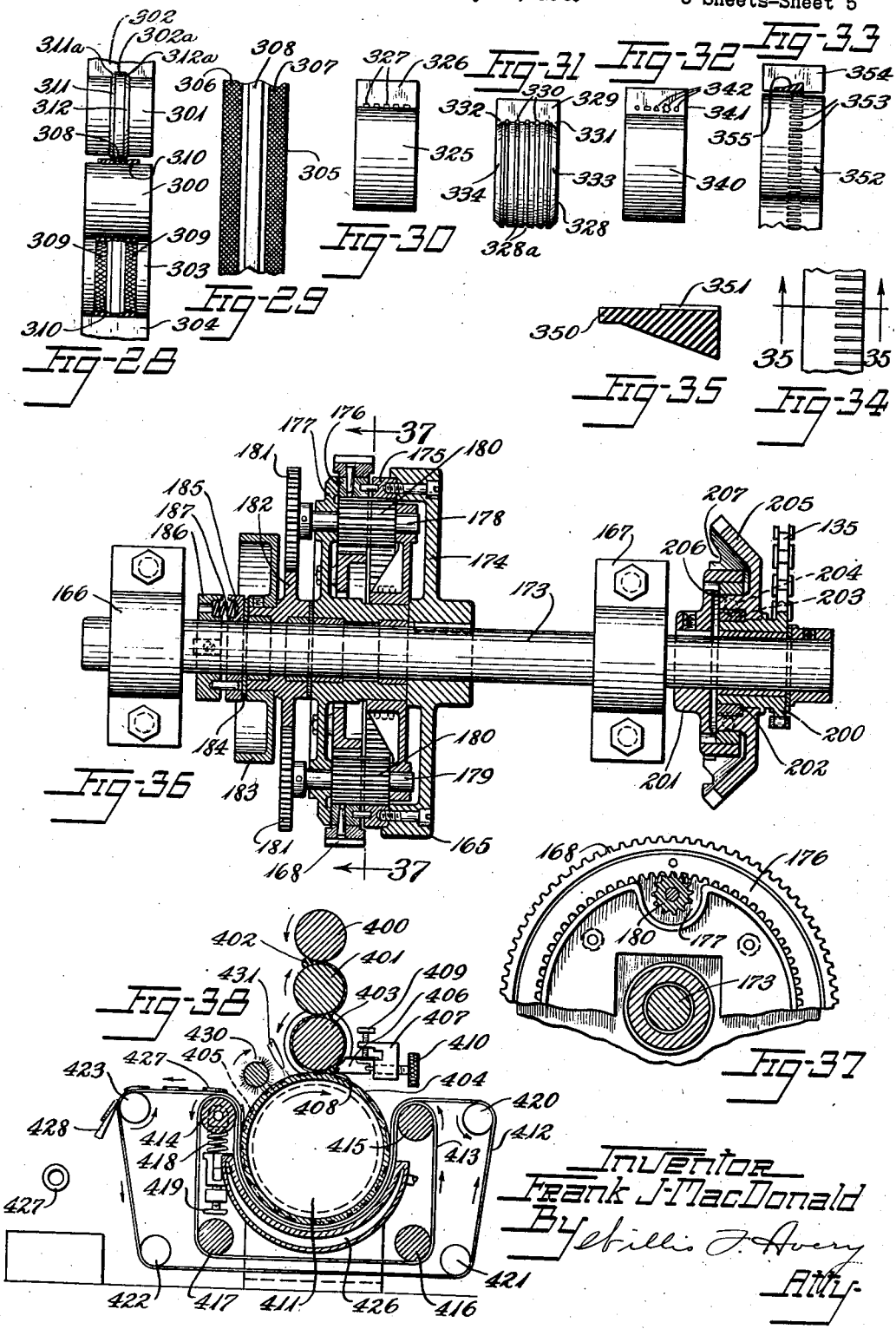

Patented Sept. 12, 1944

2,358,176

UNITED STATES PATENT OFFICE 2,358,176

METHOD AND APPARATUS FOR MAKING ARTICLES OF PLASTIC MATERIAL

Frank J. MacDonald, Brookline, Mass., assignor to The B. F. Goodrich Company, New York, N. Y., a corporation of New York Application May 22, 1940, Serial No. 336,634

7 Claims. (Cl. 18—2)

This invention relates to methods and apparatus for making articles of plastic material and is especially useful in the manufacture of articles in the form of strips or sheets of embossed or perforated material in one or more colors and also in the manufacture of pieces, parts and other individual articles.

In the manufacture of articles of rubber-like material and other plastic materials it is often desirable to provide decorated strip or sheet material of one or more colors having embossed portions or perforations therein without the use of cutting dies or molds and to provide such material continuously without interruption and to simultaneously unite the various colored portions thereof as they are formed without waste of material. Because of the difficulty of attaining sufficient pressure on the plastic material, the inadequate facilities for removing entrapped air from the plastic material, and the shrinkage of the plastic in cooling, and incomplete filling of the cavity, such operations heretofore have not been performed satisfactorily on the ordinary rubber calender. The construction of the ordinary calender has also been such that the changing of rolls has been difficult and the construction of accurately machined rolls having forming grooves or cavities has been impracticable, while accurately fine adjustment has been virtually impossible.

Rolls engraved in intaglio for printing with fluid inks have not been suitable for handling stiffer plastic material necessary to the production of relatively thick deposits and have not been suitable for forming highly attractive articles or strips of multi-colored material and decorating strips of irregular surface contour.

An object of the invention is to make it possible to produce in stiffer or more viscous rubber and other plastic materials a fine quality of detailed design and ornamentation comparable with results heretofore obtainable only by procedures of intaglio printing with substances of relatively great fluidity.

A further object is to form the material under high pressure in cavities of a movable member without malforming the deposit as a result of the movement.

Further objects are to provide these results by means of rotating rolls, to provide continuously articles of complicated form without excessive waste; to effect accurate and simultaneous assembly of parts of different colors; to provide uniformity and solidity of composition; to provide articles free from surface blemishes and occluded air bubbles; to provide efficient apparatus for forming such articles; to provide means for accurately registering the separately formed parts of the article in assembled relation; to provide wide latitude of adjustment of the forming apparatus; to provide for synchronizing the formation of the parts of the article; and to provide adaptability of the apparatus to the manufacture of many different articles.

These and other objects will appear from the following description and the accompanying drawings.

Of the drawings

Fig. 1 is an elevation partly in section of one form of apparatus corresponding to the invention.

Fig. 2 is a front elevation of the forming rolls thereof, other parts being broken away.

Fig. 3 is a cross-sectional detail view of one of the rolls taken on line 3—3 of Fig. 2.

Fig. 4 is a similar view taken on line 4—4 of Fig. 2.

Fig. 5 is a plan view of a portion of a strip produced by the apparatus of Figs. 1 to 4.

Fig. 6 is a cross-sectional view of the strip taken on line 6—6 of Fig. 5.

Fig. 7 is a plan view of another strip which may be produced by the apparatus of Figs. 1 to 4 by the use of different forming rolls.

Fig. 8 is a cross-section thereof taken on line 8—8 of Fig. 7.

Fig. 9 is a cross-sectional view of a modified form of the apparatus, only essential parts of the forming mechanism being shown, other parts being omitted.

Fig. 10 is a front elevation of another form of apparatus embodying the invention.

Fig. 11 is a side elevation of the same.

Fig. 12 is a rear elevation of the same.

Fig. 13 is a plan view thereof.

Fig. 14 is a detail cross-sectional view thereof taken on line 14—14 of Fig. 13.

Fig. 15 is a cross-sectional view of the nicking roll taken on line 15—15 of Fig. 11.

Fig. 16 is a sectional elevation of the apparatus taken on line 16—16 of Fig. 10 and showing the apparatus as set up for forming the article of Fig. 18.

Fig. 17 is an elevation showing the essential forming rolls of the apparatus of Fig. 16 as used in forming the strip of Fig. 18, other parts of the apparatus being omitted.

Fig. 18 is a plan view of a portion of the strip of material produced by the apparatus of Figs. 16 and 17.

Fig. 19 is a cross-sectional view of the strip taken on line 19—19 of Fig. 18.

Fig. 20 is a sectional view similar to Fig. 16 but showing the essential parts of the apparatus as set up for forming the strip illustrated in Fig. 21, other parts of the apparatus being broken away.

Fig. 21 is a plan view of a portion of a strip produced by the apparatus of Fig. 20.

Fig. 22 is a cross-sectional view of the strip taken on line 22—22 of Fig. 21.

Fig. 23 is a view similar to Fig. 17 showing the forming rolls as used for forming the strip of Figs. 21 and 22.

Fig. 24 is a cross-sectional view of the forming rolls of the apparatus as set up to produce the strip illustrated in Fig. 25, other parts of the apparatus being broken away.

Fig. 25 is a plan view of a portion of the strip produced by the apparatus of Fig. 24.

Fig. 26 is a cross-section thereof taken on line 26—26 of Fig. 25.

Fig. 27 is a face view of the forming rolls of the apparatus of Fig. 24, other parts being omitted.

Fig. 28 is a detail view showing the forming rolls for providing the strip illustrated in Fig. 29, other parts being broken away.

Fig. 29 is a plan view of a portion of a strip formed by the apparatus of Fig. 28.

Fig. 30 is a detail view showing a single forming roll and a cooperating forming member suitable for forming plastic strips or threads of rectangular cross-section.

Fig. 31 is a similar view showing another forming roll and its cooperating forming element suitable for forming plastic strips or threads of circular cross section.

Fig. 32 is a similar view showing a plain face roll and its cooperating element as adapted to extrude threads of various cross sections.

Fig. 33 is a detail view of a pair of forming rolls and a cooperating forming element for forming a strip illustrated in Fig. 34, other parts being broken away.

Fig. 34 is a plan view of a portion of a strip as produced by the apparatus of Fig. 33.

Fig. 35 is a cross-sectional view of the strip taken on line 35—35 of Fig. 34.

Fig. 36 is a cross-sectional detail view of the speed changing mechanism taken on line 36—36 of Fig. 13.

Fig. 37 is a detail sectional view of the planetary gear mechanism taken on line 37—37 of Fig. 36, parts being broken away.

Fig. 38 is a cross-sectional elevation of a modified form of the apparatus as used for forming separate molded articles.

Referring to the drawings, the invention generally relates to the forming of articles from plastic material by continuously filling cavities in the face of one or more forming rolls or other surfaces with plastic composition and then progressively uniting the formed material in the cavities with strip or sheet material or other formed plastic deposits. By adjustment of the mechanism strips of plastic material may be extruded of various cross-section or separate articles of plastic material may be formed by deposits of plastic material in cavities formed in the rolls of the apparatus and may be wholly or partially vulcanized or otherwise heat-treated in the same operation.

The basic principles of the invention may be more readily determined from an examination of the simple forms of the apparatus illustrated in Figs. 1 to 9 of the drawings.

Referring to these drawings, and first to Fig. 1, the apparatus comprises a pair of spaced frame members 10, only one of which is illustrated, and between which are rotatably supported in parallel spaced relation, a forming roll 11, an intermediate or transfer roll 12, and a second forming roll 13. These rolls are similar in construction to the rolls of a calender such as is used in the forming of sheet material from plastics such as rubber and other rubber-like materials and are driven in the directions indicated by the arrows in Fig. 1 by suitable intermeshing gears, not shown.

The faces of the forming rolls 11 and 13 are of hardened material, such as tempered tool steel, and are formed with forming cavities 14 and 15 respectively, in their faces, corresponding to portions of a two-color strip to be produced, such as the strip illustrated in Figs. 5 and 6, where the base layer 16 is formed of one color with perforations 17 extending therethrough, and the portions 18 and 19 are formed of plastic material of a contrasting color and adhered thereto.

For the purpose of forming such a strip, the roll 11 which forms the base strip 16, is provided with a circumferential groove 14 corresponding in depth to the thickness of the layer 16 and in width to the desired width thereof and spaced pins 20 are inserted in spaced openings 21 in the face thereof at the bottom of the groove 14 and project flush with the face of the roll in order to displace the plastic material to form the perforations 17. The roll 13 has a continuous meandering cavity 22 formed in its face to form the strip 18 and also has a series of spaced cavities 23 formed therein to provide the portions 19 of the strip. The transfer roll 12 need not be of hardened material and may be spaced slightly from rolls 11 and 13 and suitable mechanism may be provided for adjusting the rolls 11 and 13 toward and from the roll 12 as is usual in the construction of calenders.

For the purpose of filling the cavity in the roll 11, a pair of feeding rolls 24, 25 are mounted for rotative movement in the directions indicated by the arrows in Fig. 1, adjacent the roll 11 and parallel thereto and these rolls are driven by gears, not shown, mounted on the ends of rolls 24, 25 and meshing with each other, the gear on roll 25 also engaging and being driven by a gear mounted on roll 11. The feeding roll 25 is adjustable toward and away from the feed roll 24 and for this purpose adjusting screws 26 may be provided, threaded through the frame members 10 and engaging slideable journal boxes 27 in which the roll 25 is rotatably mounted. The roll 24 is also preferably adjustable with relation to the roll 11. The rolls 24 and 25 may be driven at the same speed but are preferably driven at a faster surface speed than the roll 11.

A shoe 28 is adjustably mounted on a bracket 29 fixed in the frame members 10 and comprises a plate extending along the face of the rolls substantially in contact with the roll 25 and having an inclined face 30 adjustable toward and away from the face of the roll 11 and defining a space between the shoe and the roll 11 converging in the direction of rotation of the roll 11. The shoe 28 may be adjusted toward and away from the roll 11 by screws 31 threaded therethrough and extending through the bracket 29, collars 32 and 33 fixed to the screw on either side of the bracket permitting rotation of the screw with relation to the bracket while preventing axial movement of the screw with relation to the bracket.

The operation of the apparatus is as follows: The plastic material 34 is fed between the rolls 24 and 25, where occluded air is expressed therefrom, and becomes crowded into the cavity between rolls 24, 25 and 11, and the stationary shoe 28. Due to the greater surface speed of the rolls 24 and 25 and restriction of flow of the plastic by reason of the presence of the shoe any remaining occluded air is worked out of the plastic material and the cavities in the roll 11 are filled with plastic material free from occluded air and under high pressure. By adjusting the rolls 24 and 25 toward each other and by adjusting the shoe 28 toward the bite of the rolls 11 and 25, the pressure of the trapped material may be increased and due to the inclined face of the shoe the material is progressively crowded into a narrowing passage, while at the same time the plastic material is agitated by the rollers and is kept constantly in motion. The space defined by the faces of rolls 24, 25 and 11, and shoe 28 serves as a pressure chamber to confine the plastic material under pressure and this pressure may be adjusted by varying the distance between rolls 24 and 25 or by increasing their speed. Any material escaping above the shoe 28 along the face of roll 25 is returned to the bank 34 at the feeding position while its pressure balances the pressure of material passing under the shoe to fill the article cavities. As the cavities in the roll 11 become filled they progress downwardly beyond the shoe 28 and where the shoe 28 is forced into intimate engagement with the plain face of the roll 11 only the cavities will be filled and substantially no excess material will remain on the face of the roll 11.

By adjustment of the shoe 28 and of the rolls 25 and 24 with relation to each other, the pressure of the plastic material escaping from the cavity by reason of entrapment on the face of the roll may be nicely regulated. Moreover, it is found that due to the peculiar compacting action of the rolls and the shoe upon the plastic material the speed of travel of the plastic from the pressure chamber is increased and the material deposited therefrom in the cavities is deposited under pressure and dragging action of the shoe is eliminated and tendency to shrink upon being removed from the apparatus is overcome. By increasing the compacting action the strip material or articles upon being removed from the apparatus may actually increase in length due to recovery as distinguished from the shrinkage ordinarily taking place in material which has been produced by a calendering machine so that by proper regulation of the pressure by adjustment of the feeding rolls and the shoe the material may be produced of accurate dimensions free from shrinkage or swelling.

Provisions are made as is usual in plastic working machinery, for heating the rolls and other parts of the apparatus with which the plastic material comes in contact and regulation of temperature of these parts is important. Such temperature controlling apparatus is well known and is not illustrated but the rolls are made hollow and are provided with steam and water connections for regulating the temperature. The shape of the shoe is also important and the dimensions of the shoe, particularly the angularity of the face with respect to the surface of the roll with which it contacts, may be changed by substituting shoes of different dimensions depending upon the type of plastic material to be operated upon.

Where the pressure is too low the cavities of the roll 11 will not be completely filled and where the pressure is too high the plastic material will overfill the cavities and will splurt out through the cavities as they pass the shoe in undesirable strings and blobs of excess material. It is found that the best results are obtained when the speed of the feeding rolls is such and the rolls are at such a distance apart and the adjustment of the shoe is so regulated that the cavities passing the shoe are overfilled to such an extent that the face of the deposits is slightly convex. The adjustment will vary with the plasticity and temperature of the material and for regulating the temperature all of the rolls on the machine are hollow and are provided with means not shown for heating and cooling the rolls, such means being commonly employed on calender rolls used for forming plastic material. In practice, only slight surplus pressure is required to produce undistorted parts. Similar feeding mechanism comprising similarly arranged and adjusted feeding rolls 35, 36 and a similarly arranged and adjustable shoe 37 are provided for filling the cavities of the roll 13 with plastic material 38 in the same manner.

The strip 16 formed by the roll 11 is fed around the transfer roll 12 where it contacts with the strip 18 and the portions 19 of plastic material of a contrasting color formed in the cavities of the roll 13 and unites therewith lifting such material from the cavities of the roll 13 in forming a composite strip such as that illustrated in Fig. 5. By control of the temperatures of the respective rolls such transfer may be facilitated as is well known in the art of calendering plastic material. Certain materials will adhere more tenaciously with a cold roll than a hot roll and vice versa. The finished strip may be removed from the transfer roll 12 by means of a conveyor belt 39 driven at the same speed as the roll 12 and passing around a roller 40 rotatably mounted on the frame of the machine adjacent the roll 12. Where it is desired to form single strips and remove them separately, a second conveyor 41 may be provided adjacent the roll 11 and passing about a roll 42 also mounted on the frame of the machine.

To provide for removal of any excess material deposited on the face of roll 11, a scraper blade 43 may be adjustably mounted on the bracket 29 below the shoe 28 and is adjustable toward and away from the roll 11 by means of adjusting screws 44. A similar scraper blade 45 may be mounted adjacent the roll 13 and is adjustable by means of screws 46 into engagement with the face of the roll 13, whereas the feeding rolls 24, 25 provide a convenient means for feeding plastic materials to the converging space between the shoe 28 and the roll 11.

These feeding rolls 24, 25 may be eliminated with certain types of plastic material as in the modified form of the invention illustrated in Fig. 9 where the forming roll 50 has a forming cavity or groove 51 formed therein and a shoe 52 is adjustable toward the face of the roll as by an adjusting screw 53. In this form of the invention the shoe 52 has a long curved face 54 spanning an arc of substantially 90° and of a greater radius of curvature than the face of the roll 50 so that the heel 55 of the shoe may be held in intimate contact with the face of the roll and the arcuate face 54 thereof defines with the face of the roll a space converging in the direction of rotation of the roll. The plastic material 56 may be fed into this space where its travel into the space is accelerated by contact with the face of the roll and retarded by drag of the arcuate face of the shoe so that the material is rolled into a constantly narrowing space and the hydrostatic pressure thereof constantly increases toward the heel of the shoe where the material is forced into the cavity of the roll under surplus pressure while during such rolling movement all occluded air is expelled and the density of the material is increased.

As in the form of the invention illustrated in Figs. 1 to 4 a scraper bar 57 may be provided to contact with the face of the roll beyond the heel of the shoe to remove any undesirable excess material and a conveyor belt 58 passing about an idler roll 59 adjacent the forming roll 50 may be provided for conveying away the formed strip of material. In the form of the apparatus illustrated, articles such as that illustrated in Fig. 7 may be formed as a continuous strip comprising articles separated by connecting strips 60. It will be understood that the roll 50 corresponds to the roll 11 of the apparatus of Fig. 1 and may be mounted in such apparatus and heated and cooled and driven in the same manner as the roll 11.

The apparatus illustrated in Figs. 10 to 37 illustrates a more universal type of apparatus embodying the invention and referring to these drawings the numerals 70, 71 designate a pair of spaced frame members which are mounted vertically upon a suitable foundation and are held in spaced relation by frame members 72, 73 and 74. Slidably mounted upon frame members 70 and 71 in a vertical direction near the upper ends thereof are supplementary frame members or carriages 75, 76 and below these are a second pair of supplementary carriages 77, 78. For the purpose of adjusting the upper frame members vertically with relation to the lower frame members to unite the parts formed by the means carried thereby, the frame members 70, 71 are formed with vertical clearance slots 79. A plurality of studs 80 extend through these slots and are fixed to a spacer bar 81 at one end thereof and to a block 82 at the other end thereof (see Figs. 11 and 14). The spacer bar 81 is rigidly secured to the carriage members 75, 76. A pair of adjusting screws such as a screw 83 extend through bushings 84 at the top of the frames 70, 71 and their threaded ends engage in threaded openings 85 in the block 82. The bushings 84 are flanged above and below that part of the frame members through which they extend and clearance is provided about the bushings so that the block 82 may be moved horizontally to a certain extent. The adjusting screws 83 have capstan bars 86 for rotating them to adjust the carriage members 75, 76 in a vertical direction. For providing limited horizontal adjustment of the carriages 75, 76 adjusting screw 87 extends through a clearance opening 88 in the frame member 71. The screw is horizontally mounted and the threaded portion engages a threaded opening in the block 82. The screw 87 has collars 89, 90 fixed thereto at each side of the opening 88 and also has handwheel 91 fixed thereto by which the screw may be rotated to adjust the block 82 in a horizontal direction limited by the dimensions of the clearance opening 88.

The carriages 75, 76 have aligned bearing openings through which a pair of roll supporting shafts 92, 93 are rotatably mounted, the shafts extending horizontally and one above each other. Above the roll 93 vertical slots 75a are provided through the carriages and roll supporting shafts 94, 95 extend therethrough above the rolls 92, 93, all of the roll shafts 92, 93, 94, 95 being parallel and having their axes preferably in a common vertical plane. Roll 94 is rotatably mounted in a pair of bearing members 96, one end of each of which is pivoted to a carriage 75 or 76 by a stud 97 and the other end of which is bifurcated and engages over collar 98 on an adjusting screw 99 which is threaded through a carriage member 75 or 76 and has a capstan bar 100 for turning the same, the arrangement being such that roll shaft 94 may be adjusted toward and from roll shaft 93 by movement of the adjusting screws 99. By a similar arrangement, roll shaft 95 is supported by bearings 101, one end of which is pivoted to a carriage member 75 or 76 by stud 102 and the other end of which engages a collar 103 mounted on a screw 104 threaded through the carriage member and adapted to be turned by a capstan bar 105.

The carriage members 77, 78 are similar to the carriage members 75, 76, except that they are rigidly secured to frame members 70, 71 and are provided with similar roll adjusting mechanism for rotatably supporting a series of roll shafts 106, 107, 108, 109, roll shafts 106 and 107 being rotatably mounted in bearings of these carriage members and roll 108 being rotatably mounted in bearing members 110 adjustable by screws 111 and roll 109 being rotatably mounted in bearing members 112 adapted to be moved by rotation of screws 113, the mechanism for adjusting the rolls being the same as that for adjusting the rolls supported by the carriage members 75, 76 and the roll shafts being in the same plane as the roll shafts supported by the carriage members 75, 76. Mounted on the top of the carriage members 77, 78 are a pair of housings 114, 115. Through these is rotatably mounted a roll support shaft 116. Mounted in these housings for adjustment in a horizontal direction toward and from the roll 116 are a pair of boxes 117, through which a roll supporting shaft 118 extends, this shaft being rotatably mounted with respect to the roll shaft 116. Adjusting screws 119 extend through the housings 114, 115 for the purpose of adjusting the roll 118 toward and from the roll shaft 116.

Each of the roll shafts heretofore described is adapted to extend beyond the frame members 71 and there to support and drive a plastic manipulating roll removably mounted on the end of each shaft and for this purpose the ends of the shafts extending beyond the frame member are provided with tapered seats such as the seat 120 shown in Fig. 15 and beyond the seat the shaft is threaded as at 121 to engage a nut 122 which presses a washer 123 against the roll to hold it on its tapered seat.

Referring to Fig. 10, these rolls, with the exception of the roll on shaft 118, extend in vertical alignment and may be adjusted to come into contact with each other face to face and are designated by the numerals 124, 125, 126, 127, 128, 129, 130, 131, 132. The roll 133 is mounted on the end of shaft 118 and is out of the plane of the other rolls but is adjustable into contact with the face of the roll 128. All of these rolls are easily removable and may be replaced by similar rolls for the production of different plastic strips or articles.

For the purpose of driving the upper set of rolls supported by the carriages 75, 76, shaft 94 is extended beyond the carriage 75 and a sprocket wheel 134 is mounted thereon and adapted to be driven by a chain 135 from a suitable source of power hereinafter to be described. Between the carriages 75, 76 the shafts 92, 93, 94, 95 have gear pinions 137, 138, 139, 140 fixed thereto respectively and meshing with each other, the gears being each of the same size and the rolls being driven at the same surface speeds in the directions indicated by the arrows in Fig. 16.

For the purpose of driving the rolls supported by the fixed carriage members 77, 78 shaft 108 is extended beyond carriage members 77 and is provided with a similar driving sprocket 141 fixed thereto and driven by chain 142 from a suitable source of power as hereinafter described and shafts 106, 107, 108, 109 are provided with driving pinions 143, 144, 145, 146 fixed thereto, respectively, and intermeshing with each other. The shaft 116 has a gear 147 fixed thereto which meshes with gear 137 but does not engage gear 143, gear 147 being to one side of the train of gears 143 to 146 therebelow and gear 137 having a wider face than the other gears so as to engage the gear 147. The arrangement is such that the rolls supported by the fixed carriages 77, 78 with the exception of rolls 128 and 133, are driven from sprocket 141 and may be operated independently of the other rolls of the machine, and the rolls supported by the movable carriage members 75, 76 may be driven in unison by the sprocket 134 independent of the rolls supported by the fixed carriage members 77, 78 but when the carriage members 75, 76 are in their lowermost position will drive rolls 128 and 133 by reason of gear 137 meshing with gear 147. Roll 133 is driven from roll 128 through spiral gears 148 and 149 which are mounted respectively upon shafts 116 and 118 and mesh together.

Gear 148 is fixed on shaft 116 but gear 149 is mounted to slide axially of its shaft 118 for the purpose of rotatably adjusting roll 133 with relation to roll 128 for the purpose of registering roll 133 with work which has been formed on the preceding rolls as hereinafter described. For this purpose a slot 150 extends diametrically through the shaft 118 and a pin 151 is fixed to gear 149 and extends through the slot. The shaft 118 is bored to receive a coil spring 152 which impinges between the bottom of the bore and the pin and urges the gear to the right in Fig. 15. A rod 153 extends through the bore of the shaft and impinges against the pin 151. Its outer end is threaded as at 154 to engage similar threads in the bore of the shaft and a handwheel 155 is fixed to the end of the rod. By rotation of the handwheel with respect to the shaft the gear may be forced to the left against the pressure of the spring and due to the inclined form of the teeth of the gears 148 and 149, shaft 116 will be rotated by the axial movement of the gear.

Sprockets 134 and 141 may be independently driven from any desired source of power but means are preferably provided for driving them in unison or for driving each of them independently or for varying the speed of each sprocket in order to vary the speed of the respective set of rolls which they control. For this purpose an electric motor 156 is mounted on frame members 70, 71 and has a shaft 157 to which is fixed a sprocket 158. A countershaft 159 is mounted in bearings 160, 161 on the frame members 70, 71 and has a sprocket 162 fixed thereto, and a chain 163 engages sprockets 158 and 162 so as to drive the shaft 159 continuously at a uniform velocity. A pinion 164 is fixed to shaft 159. A change speed mechanism 165 is rotatably mounted in bearings 166, 167 on frame members 70, 71 and has a driving gear 168 which meshes with the pinion 164. This change speed mechanism is of the planetary gear type and is illustrated in Figs. 36 and 37. A similar change speed mechanism 169 is similarly mounted in bearings 170, 171 fixed to frame members 70 and 71 respectively, and has a gear 172 which also engages pinion 164, the arrangement being such that both change speed mechanisms are driven at a uniform speed in unison from shaft 159.

Referring to Fig. 36, the change speed mechanism 165 is as follows: A shaft 173 is rotatably mounted in the bearings 166, 167 and has a disc 174 fixed thereto and an internally toothed ring gear 175 is fixed to disc 174. A second internally toothed ring gear 176 having a slightly less number of teeth is mounted adjacent to the ring 175 on a planet gear support 177, the planet gear support being rotatably mounted with respect to the shaft 173 and being journaled thereon and the ring gear 176 being freely rotatable with respect to the planet gear support 177 and being journaled thereon to slide thereabout. The driving gear 168 is an externally toothed ring gear and is fixed to the ring gear 176. A plurality of planet shafts 178, 179 are rotatably mounted in bearings formed in the planet gear support parallel to the shaft 173. Each shaft 178, 179 has a planet pinion 180 fixed thereto in position to mesh with both the ring gears 175 and 176 simultaneously. Each of these planet shafts also has a planet gear 181 fixed thereto in position to mesh with a sun gear 182 having a bearing about and rotatable with respect to the shaft 173. A brake drum 183 is fixed to the sun gear and may be held from rotation by a brake mechanism hereinafter described, when desired. A friction collar 184 is loosely mounted about the shaft 173 between the brake drum and a pair of collars 185, 186, one of which is fixed and the other of which is slidably mounted on shaft 173 for movement axially of the shaft 173. A coil spring 187 is compressed between the collars 185 and 186 so as to provide a slight braking effect upon the sun gear 182. A brake arm 188 is fixed to a shaft 189 rotatably mounted through frame members 70, 71 and a roller 188a slidably mounted on the arm 188 under tension of a spring 190 engages in a notch 91 formed on frame member 71 and acts to hold the arm in a fixed position. A pair of brake shoes 192, 193 are also fixed to the shaft 189 in a position normally free from contact with the surface of the brake drums of the speed changing mechanisms 165, 169 respectively, but adapted to selectively engage the surface of such drums when the arm 188 is moved in either direction. The arrangement is such that in the normal position of the brake shoes out of contact with the brake drum the shaft 173 of the speed changing mechanism 165 and a corresponding shaft 194 of the other speed changing mechanism 169 will be driven at the same speed, as the sun gear 182 can rotate about the shaft freely under the slight friction exerted by the friction disc 184. But if either brake shoe is pressed against the brake drum of one of the speed changing mechanisms, the sun gear thereof will be held stationary or will be decelerated so that rotation of the pinion 180 by the ring 176 will cause the planet gear 181 to roll about the sun gear 182 thereby causing the shaft 173 to rotate at a different angular velocity from that of the gear 168.

As will be seen from the operation of the apparatus hereinafter described, one strip of plastic is formed by the rolls supported by the lower or fixed carriage of the machine and another strip of rubber is formed by the rolls carried by the upper or movable carriage of the machine and it is necessary to synchronize the delivery speeds of these sets of rolls in order to bring the two strips into registry. Normally the two sets of rolls will be driven by the mechanism just described at a uniform velocity but by moving the brake arm either set of rolls may be momentarily retarded until the strips are in proper registry whereupon the brake arm assumes its position of rest out of contact with the brake drums and the two sets of rolls again operate in unison.

For driving the two sets of rolls independently, the shaft 173 has a sprocket 200 rotatably mounted on the end thereof and engaging the chain 135. It is driven from the shaft 173 through a roller clutch mechanism similar to the coaster brake of a bicycle and comprising a driving member 201 fixed to the shaft 173, a driven member 202 fixed to the sprocket 200 and having flattened clearance portions 203 thereon, rolling elements 204 therebetween, and a locking disc 205 having arms 206 extending between the rolling elements and also having peripheral notches 207 adapted to be engaged by a locking member. The arrangement is such that when the locking disc 205 is undisturbed the rolling elements 204 will wedge between the driven member and the driving member and the sprocket 200 will be driven at the same speed as the shaft 173. When the rotation of the locking disc 205 is prevented the rolling elements will be moved adjacent a flattened portion of the driven member and the shaft 173 will rotate independent of the sprocket 200. For locking the locking disc 205 a rock shaft 208 is rotatably mounted in one of the fixed frame members of the machine and is provided with an arm 209 fixed thereto and having a roller detent 210 slidably mounted thereon against the pressure of a coil spring 211 so as to engage in a notched plate 212 also fixed to the frame. A locking arm 213 is fixed to the shaft 208 in such a position as to engage in one of the notches of the locking disc 205 in one position of the arm 209 and a similar locking arm 214 is fixed to the shaft 208 in a position adjacent to the corresponding locking disc of the other change speed mechanism and is engageable therewith at another position of the arm 209, both of the locking arms being out of engagement with their locking discs at an intermediate position. The notched plate 212 has three notches and the arm 209 is normally engaged with the intermediate notch so as to permit both roller clutches to function in driving the forming rolls. But by moving the arm 209 into one of the end positions one of the sets of rollers will be driven and the other set of rollers will remain stationary. By moving the lever arm 209 further in either direction both locking gears may be engaged to stop both sets of rolls.

The operation of the apparatus of Figs. 10 to 37 is generally similar to the operation of the simpler apparatus of Figs. 1 to 9 and is as follows:

Plastic material is fed between rolls 124, 125 where air is forced therefrom and follows roll 125 to the surface of roll 126 which it then follows until it is crowded into the pressure chamber between the roll 126, the forming roll 127 and the shoe 243. Here the pressure of the plastic material is increased due to converging space and feed of the plastic and the depressions in roll 127 are filled. Similarly plastic material fed between rolls 131, 132 passes around rolls 131 and 130 in succession and is fed into a converging space between rolls 129 and 130 and shoe 236 where it is forced into the depressions of roll 129. The material deposited in the depressions of roll 129 adheres to roll 128 and passes thereabout where it meets and adheres to the material deposited in the depressions of roll 127 to form a completed strip. The strip passes between roll 128 and roll 133 which may be used to press the material, to emboss it, or to cut it in sections. In such a case, roll 128 acts as a smooth-faced backing roll, whereas roll 133 is engraved and acts as an embossing roll corresponding to the nicking roll 266 of Fig. 20 or 290 of Fig. 24. The finished articles are conveyed away by conveyor 248. In order to synchronize the deposits the lever 188 may be manipulated to slow up or to accelerate one set of rolls with respect to the others and the hand wheel 155 may be adjusted to circumferentially adjust the roll 133. Either or both of the sets of forming rolls may be stopped by means of the lever 209. Any of the rolls may be removed from their shafts and replaced by other rolls depending upon the article to be produced.

Referring to Figs. 16 to 19 where it is desired to provide a strip 225 of plastic material of one color having isolated bodies 226 and 227 of plastic material of another color affixed to its face, the plastic material 228 for forming the strip 227 is fed between rolls 131 and 132 to form a strip of material which follows the roll 131, a suitable support 229 being provided adjacent the bite of the rolls to support the supply of material. The roll 132 is provided with flanges 132a which engage over the end faces of the roll 131 and prevent lateral spreading of the plastic material beyond the face of the roll 131. The rolls 131 and 132 comprise the feed rolls of the lower part of the apparatus. The plastic material traveling about the roll 131 passes between rolls 130 and 131 and then between the roll 130 which has confining flanges 130a and a pattern roll 129. The pattern roll has a groove 230 thereabout having upstanding pins 231 for forming the perforations of the strip 225.

A shoe 232 having an arcuate surface presented toward the roll 130 is supported by a bar 233 fixed to the carriage members 77, 78 and by adjusting screws 234, 235 threaded therethrough and engaging cavities in the shoe 232. The plastic material which passes between the rolls 130 and 131 forms a bank between the shoe 232 and the roll 130. The space between the roll and the shoe is of gradually decreasing dimensions and the drag of the stationary shoe on the plastic material and the decreasing thickness of the space works the plastic material to remove occluded air bubbles and presents the material to the bite between the rolls 129, 130 under such pressure as to prevent substantial shrinkage of the formed strip.

A combination shoe and scraper 236 is adjustably mounted at the opposite side of the rolls, between the flanges 130a with which it contacts, by a bar 237 supported by the fixed carriage members 77, 78 and is adjustable by means of horizontal screws 238 threaded through the bar 237 and engaging recesses in the shoe and vertical screws 239 threaded through the supporting bar 237 and engaging flat spring members 240 fixed to the shoe 236. The scraper has its edge inclined upwardly from the upper end or toe of the shoe to engage the surface of the roll 129 and scrapes any excess material from that roll, the excess material returning around the roll 130 to the bank on the opposite side of the roll by way of a narrowed throat 236a defined by a convex heel 236b of the shoe and the convex face of the roll 130, thereby eliminating trimmings and returning the plastic for reworking without loss of temperature. The pressure of the material at this throat assists in holding the scraper into contact with roll 129 and its pressure may be controlled by adjustment of the screws 237, 239 to vary the throat space so as to more or less prevent escape of excess plastic. When the shoe is set for unrestricted escape of excess plastic the pressure of plastic in the pressure chamber defined by the faces of the rolls and the shoe drops practically to zero, the plastic does not remain in the roll cavities, but rolls up and sticks to the trailing edge of the scraper blade. When the shoe is set for too low a confining pressure for best results, the plastic remains in the cavities, but the cavities are not completely filled at the leading edge thereof and the deposited plastic is more or less distorted and rough on its exposed surface. When the scraper is set for slightly excessive pressure, the plastic slightly overfills the cavities, is clean cut and smooth at its edges, and somewhat swollen in its middle portion which projects slightly above the surface of the roll. This is the ideal condition for joining the deposits thus formed to other material by pressure. When the shoe and scraper are set for excessively high pressure, the plastic, using the cavities as an avenue of escape past the scraper, spurts out at a speed greater than the speed of travel of the cavities and is of undesired form. The screw 238 may be easily adjusted to produce the desired result by maintaining the desired pressure regardless of the consistency of the plastic.

Good working contact of the scraper with the roll is maintained at all times by the pressure of excess material returning about roll 130 being in excess of the pressure tending to lift the scraper from the roll face and this is assisted by angular disposition of the blade. The flat spring 240 is only necessary where the blade is acting against a roll above it when it prevents dropping of the scraper from the roll face.

The ironing plate or shoe 232 is not always necessary but is especially useful where rapid feed of plastic requires wide separation of rolls 131, 132 in which case the quick passage of material between these rolls prevents working of the plastic therebetween for sufficient time to force air therefrom. The shoe 232 also assists in confining the plastic at the pressure chamber when rolls 129, 130 are widely separated.

Where the ironing shoe 232 is used its discharge end is adjusted to permit the desired quantity of plastic to escape to supply the pressure chamber, and roll 132 is adjusted with relation to roll 131 to maintain the convergent space between the roll 130 and the shoe full at all times. Adjustment of the angle of convergence may be made by use of screws 234, 235. A small angle increases self cleaning whereas a wide angle increases ejection of occluded air and the best angle varies with different compositions. It is desirable to promote self cleaning so that no plastic adheres to the shoe and becomes cooled below the best working temperature. The finished strip travels around the roll 129 and then around the transfer roll 128.

A second bank of plastic material 241 is fed into the bite between the feeding rolls 124, 125 at the top of the apparatus and then about the flanged roll 126 into contact with the engraved roll 127. This roll has cavities 242 and 242a formed therein for forming the portions 226, 227 of the strip respectively. As it is desired to form separated deposits on the face of the roll 127 not requiring great volume feed of plastic, it is unnecessary to provide a shoe such as the shoe 232 on the upper rolls although such a shoe may be employed if desired. A combination shoe and scraper 243 is provided adjacent the engraved roll 127 and is similar to the shoe 236. It is similarly supported but in a reversed position by a supporting bar 244 fixed to the movable carriage members 75, 76 and is adjusted by horizontal screws 245 and vertical screws 246. A flat spring 247 is fixed to the shoe 243 and not only permits a tipping of the bar under pressure of the screws 246 but also prevents the scraper bar from dropping from its support upon release of the screws 245. The shoe and scraper 243 not only acts to scrape excess material from the roll 127 but also has an angular face which acts to confine the plastic material between the scraping edge and the bite of the rolls, thereby developing high pressure of the plastic material at the point where the material passes the scraping edge.

The deposits of plastic material in the cavities 242, 242a pass about the roll 127 and are picked up by the strip of material 225 passing about the roll 128. The assembled strip of material passes about the roll 128 and between it and the roll 133 which may be used to press the deposits 242, 242a firmly into engagement with the strip 225. The assembled material then passes from the machine over a conveyor belt 248 and appears as shown in Fig. 18.

In order to form such a strip as that illustrated in Fig. 21 where separated deposits of plastic material 250 are to be formed upon one side of a strip 251 of textile material and other separated deposits 252 are to be deposited upon the other face of the strip in registry therewith and the fabric strip is to be severed along the dotted lines 253 between the separated deposits, the apparatus may be set up as illustrated in Figs. 20 and 23. This comprises an engraved roll 254 which is mounted on shaft 92 and has cavities 255 in its face corresponding in shape to the desired deposits 250 and another engraved roll 256 having cavities 257 formed in its face and corresponding in dimensions to the plastic deposits 252.

A combined shoe and scraper blade 258 similar to the shoes of Fig. 16 is mounted to contact with the surface of the roll 254 and a similar scraper shoe 259 is mounted to engage the surface of the forming roll 256. The rolls 260, 261, 262 and 263 are plain faced rolls used for feeding the plastic materials to the forming rolls. The strip of fabric 264 is fed between the forming rolls 254, 256 and picks up the separated deposits of plastic material on its opposite faces. It then passes around the roll 256 between it and the nicking roll 265. This roll has transverse knife edges 266 formed on its face at spaced intervals corresponding to the desired cuts 253 and as the strip material passes the bite of the rolls it is partially cut through by these knife edges. Due to the plastic nature of the coating on the textile material the partially separated portions adhere sufficiently to be delivered from the roll 265 as a single strip which passes on to the conveyor belt 267 and is delivered from the machine.

In forming a strip 275 illustrated in Figs. 25 and 26 in which a contoured strip 276 of plastic material of one color has a raised bead 277 of plastic material of another color applied thereto and the bead is formed to simulate in appearance, a stitching of thread, a plain-faced roll 278 is mounted on roll shaft 116. A forming roll 279 is mounted on shaft 92 thereabove and a forming roll 280 is mounted on shaft 106 therebelow. Plastic material for forming the strip 276 is delivered between the plain-faced roll 281 and roll 280 and a stationary shoe 282 corresponding in construction to the shoe 232 previously described. A combined shoe and scraper blade 283 is mounted to contact with the face of the roll 280 to confine the plastic material under pressure and remove any excess plastic material and return it to the space between the roll 281 and the shoe 282. The roll 280 has a circumferential groove 284 having the contour of the desired strip 276 and the scraper 283 has a straight edge contacting with the face of the roll at each side of the groove. The formed strip 276 passes around roll 280 and then around transfer roll 278. The plastic material for forming the bead 277 is fed about a plain-faced roll 285 and is compressed between the face of the roll 285, the face of the roll 279 and a combined shoe and scraper 286. A scraper blade 287 is mounted on the shoe 286 and engages the face of the roll 279. The roll 279 is formed with a circumferential groove 288 of a semi-circular cross section for forming the bead strip 277. The roll is also formed with a circumferential groove 289 having flared margins 289a and the blade 287 is formed with a tongue 287a of corresponding shape which fits in the groove 289 and keeps the blade and the roll in proper axial alignment. The formed bead 277 passes around roll 279 and between that roll and the roll 278 is forced into adhesive engagement with the strip 276. The combined strip then passes between the roll 278 and a nicking roll 290 which is mounted on roll shaft 118. The nicking roll has spaced knife edges 291 spaced circumferentially thereabout and adapted to impress the bead 277 at spaced intervals 292 without severing it so as to further ornament the bead 277 giving it the appearance of looped stitches of cord.

A further modification of the apparatus is illustrated in Fig. 28 where a plain-faced roll 300, a forming roll 301, a scraper blade 302, a second forming roll 303, and a second scraper blade 304, cooperate to form the strip illustrated in Fig. 29 wherein a strip 305 of plastic material having borders 306 and 307 of plastic material of one color and a central overlaid strip 308 of plastic material of another color is provided. For this purpose the roll 303 is circumferentially grooved as at 309 to form a side strip having knurled borders and a central groove. The scraper blade 304 has a straight edge cooperating with the surface of the roll and contacting with the face of the roll only beyond the knurled borders of the groove. The base strip of plastic material 310 passes about roll 300 and the strip 308 of plastic material of another color is pressed in contact therewith by the roll 301. For forming the strip 308, the roll 301 is provided with a pair of circumferential flanges 311, 312 defining a groove therebetween in which the strip 308 is formed. The flanges have sharp edges and their faces away from the forming groove are inclined as at 311a, 312a to engage a notch 302a in the scraper blade 302, the notch being tapered at its edges to contact with the inclined faces of the flanges for the purpose of keeping the scraper blade and the roll in axial alignment and for assuring removal of excess plastic material at the margins of the strip, the arrangement being such that the scraper blade and the annular ribs are substantially self-sharpening or self-adjusting with relation to each other. Where it is desired to form fine threads of plastic material, a plain-faced roll 325 and a scraper blade 326 having rectangular notches 327 in its roll contacting face may be employed as shown in Fig. 30. The plastic material being cleanly scraped from the roll except where the notches 327 of the blade occur and the plastic material being extruded through the notches 327 and following the roll 325 from which they may be removed by a conveyor belt, not shown. This form of the invention requires no special rolls and the control of pressure afforded by regulation of the pressure chamber produces a better article than is possible with a screw feed extruder.

A similar arrangement is shown in Fig. 31 for forming plastic threads of round cross section. For this purpose a roll 328 has a plurality of half-round grooves 328a formed circumferentially in its face and a scraper blade 329 is provided with half-round notches 330 corresponding in spacing to the grooves 328a. Angular wings 331, 332 of the scraper blade engage chamfered margins 333, 334 of the roll to hold the scraper and the roll in proper axial alignment so as to align the grooves 330 with the grooves 328a. Plastic material fed between the roll and the scraper blade will be extruded through the round openings existing between the blade and the roll face and the rubber threads of round cross section so formed will travel about the roll 328 and may be conveyed away by a conveyor belt not shown.

It is also possible with the apparatus to form threads of more complicated cross section and this may be done on a plain-faced roll 340 as shown in Fig. 32 by providing a scraper blade 341 having a straight edge for engaging the face of the roll 340 and having apertures 342 through the blade back of its roll contacting edge for extruding such threads. In using this modification of the apparatus the plastic material is fed between roll 340 and another plain-faced roll, not shown, and the scraper blade 341 where the plastic material is compacted into a space of decreasing area as hereinbefore described and due to the pressure of the plastic material it is extruded through the openings 342 and the plastic threads so formed are carried around the roll 340 from which they are removed by a conveyor belt, not shown. The openings 342 may be of any shape. The control of pressure provided by adjustable return of excess plastic provides a superior product.

In forming the strips illustrated in Figs. 34 and 35 in which a base strip 350 of plastic material of one color and of generally wedge-shaped cross section, is provided with spaced cross ribs 351 of plastic material of another color. A roll 352 is provided having spaced indentations 353 in its face thereby providing cavities in which the ribs 351 of plastic material may be formed. This roll is rotated past scraper blade 354 having a wedge-shaped notch 355 in its roll contacting edge. The plastic material for forming the strip 350 is fed between the blade 354 and the roll 352 and is extruded through the notch 355 and at the same time the bars of plastic material of a different color located in the cavities 353 of the roll 352 are united with the strip 350 as that strip is formed at the notch 355 and the composite strip passes about the roll 352 to a conveyor, not shown, which removes it from the roll.

It is also possible to employ the apparatus for manufacturing disconnected relatively flat articles of plastic material. For this purpose the modification illustrated in Fig. 38 may be used. This apparatus comprises a pair of cooperating feeding rolls 400, 401 between which a bank of plastic material 402 is fed. The plastic material passes around roll 401 to a plain-faced roll 403. A roll 404 of larger diameter has cavities 405 formed in its face and is mounted to cooperate with roll 403. A shoe 406 is mounted on a bracket 407 for adjustment with relation to rolls 403, 404 and has a scraper blade 408 which contacts with the face of roll 404. A shoe 406 is of the type previously described and has an inclined arcuate face 406a which with the roll 403 and the blade 408 confines the plastic material in a space of gradually decreasing area and forces it into the cavities 405, the blade 408 removing any excess material which passes around the roll 403. By means of the adjusting screws 409, 410, which correspond to similar adjustments previously described, the pressure of the plastic material may be nicely adjusted so that cavities 405 are well filled with dense plastic material. It is desirable to at least partially vulcanize the plastic articles in order to hold their shape before they are removed from the roll 404. For this purpose the roll 404 is made of large diameter and has a steam cavity 411 formed therein for heating it to vulcanizing temperature. A conveyor belt 412 is trained about the face of the roll 404, the belt being preferably made of metal or other heat conducting material to which the plastic will not readily adhere. For applying pressure to the belt a tensioning apparatus comprising a second belt 413, a tension device 414, and guide rollers 415, 416 and 417, may be provided, the belt 413 being trained about the rollers and providing a reentrant loop between rollers 414 and 415 which engages a portion of the belt 412. Suitable tension springs 418 and adjusting screws 419 may be provided for tensioning the belt 413. The metal belt 412 is supported by the rollers 414, 415 and the reentrant loop of the belt 413, and in addition, is supported by idle rollers 420, 421, 422 and 423.

A hollow heating shoe 426 of arcuate form is positioned about the reentrant loops of the belts 412, 413 where they engage the face of the roll 405 and is provided with steam connections for further supplying heat to vulcanize the articles. The finished articles 427 adhere slightly to the belt 412 and are conveyed thereby from the roll 405, a scraper 428 being provided for separating the articles from the face of the belt.

It is to be understood that the rolls 400, 401, 403 and 404 may be mounted and driven in the same manner as the rolls carried by the shafts 93, 92, 116, and 106, respectively, of the apparatus of Fig. 10.

For cleaning the cavities of the roll 404 a rotary brush 430 may be mounted to contact with the face of the roll 404 and is rotated at a higher surface speed than that of the roll so as to remove any foreign matter or excess plastic material remaining in the cavities and an air jet 431 may also be provided for projecting a stream of air against the face of the roll for further cleaning the cavities. A molding lubricant may be sprayed onto the face of the cavities by means of the jet 431.

In any of the forms of the invention control of temperature of the forming rolls, shoes, and scraper blades is desirable and this may be accomplished by providing for circulation of heating and cooling fluids through the rolls by means of rotatable connections on the roll necks as is customary in the use of calendering machinery used in handling unvulcanized rubber and other plastic materials.

In all forms of the invention a quantity of plastic material is maintained under high pressure and cavities are filled therefrom while the pressure is regulated by adjustment of flow of excess plastic from the confining space at the pressure zone.

Variations may be made without departing from the spirit of the invention as it is defined by the following claims.

I claim:

1. Apparatus for forming an article of plastic but distortion-resisting rubber-like material directly to final surface shape, said apparatus comprising a rotatable forming surface having a depression therein defining a surface of the desired article, a pair of feed rolls for feeding the plastic material thereto, said rolls and rotatable surface having cooperating end flange means for confining the plastic material laterally, and a member between the flange means cooperating with said end flange means and with said surface and one of said feed rolls to compact and confine plastic material against the forming surface to fill said depression.

2. Apparatus for forming an article of plastic but distortion-resisting rubber-like material directly to final surface shape, said apparatus comprising a rotatable forming surface, a member stationary during operation and adjustable with relation to said forming surface cooperating therewith to form a strip of plastic material, a rotatable transfer surface, and rotatable means cooperating with said rotatable transfer surface for progressively embossing said strip.

3. Apparatus for forming an article of plastic but distortion-resisting rubber-like material directly to final surface shape, said apparatus comprising a rotatable forming surface, a member stationary during operation and adjustable with relation to said forming surface cooperating therewith to form a strip of plastic material, a rotatable transfer surface, an embossing roll adapted to engage the surface of said strip as the strip is supported by said rotatable transfer surface, and means for angularly advancing and retarding the embossing roll with relation to said rotatable transfer surface.

4. The method of forming an article of plastic but distortion-resisting rubber-like material directly to final surface shape, which comprises forming one portion of the article progressively by continuously forming disconnected deposits of the plastic material in cavities in the surface of a rotatable forming member, forming a continuous strip of plastic material in a circumferential groove of a second rotatable forming member, and uniting said deposits progressively so as to adhere the disconnected deposits to said strip.

5. Apparatus for forming an article of plastic but distortion-resisting rubber-like material directly to final surface shape, said apparatus comprising a rotatable article-shaping surface having a surface depression of final article shape, means for progressively filling said depression with the plastic material to provide an article part, means for removing excess material from the shaping surface, a second rotatable article-shaping surface having a surface depression of final article shape, means for progressively filling the depression in the second shaping surface with the plastic material to provide another article part, and means for progressively uniting the parts so formed while at least one of the parts is located in its shaping depression.

6. Apparatus for forming an article of plastic but distortion-resisting rubber-like material directly to final surface shape, said apparatus comprising a rotatable article-shaping surface having a surface depression of final article shape, means for progressively filling said depression with the plastic material to provide an article part, a second rotatable article-shaping surface having a surface depression of final article shape, means for filling the depression in the second shaping surface with plastic material to provide another article part, means for progressively uniting the parts so formed while at least one of said parts is located in its shaping depression, and means for rotating said rotatable surfaces, said last-named means comprising means for selectively rotating said surfaces to bring the article parts into registry with each other.

7. Apparatus for forming an article of plastic but distortion-resisting rubber-like material directly to final clean-cut shape, said apparatus comprising a forming roll having a surface depression of final article shape, a pressure roll cooperating therewith to fill the surface depression, a feeding roll cooperating with said pressure roll to feed plastic material to a bite between said forming roll and said pressure roll, a roll end flange at each end of the bite on one of said forming and pressure rolls and engaging the ends of the other of said rolls, to confine the plastic material laterally, means for controlling the temperature of the plastic material, a combined scraper and dividing member disposed at the exit side of the bite between the roll flanges in a position to scrape surplus material from the forming roll and to control the flow of excess material along the pressure roll, and means for adjusting said member toward and away from the bite.

FRANK J. MacDONALD.